United States Patent
Kurihara (10) Patent No.: US 7,768,594 B2
(45) Date of Patent: Aug. 3, 2010

(54) LIQUID CRYSTAL DISPLAY DEVICE

(75) Inventor: Hiroshi Kurihara, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 203 days.

(21) Appl. No.: 11/757,423

(22) Filed: Jun. 4, 2007

(65) Prior Publication Data

US 2008/0007672 A1 Jan. 10, 2008

(30) Foreign Application Priority Data

Jun. 5, 2006 (JP) ............................. 2006-155828

(51) Int. Cl.
*G02F 1/1335* (2006.01)
*G09F 13/04* (2006.01)
*G09F 13/08* (2006.01)

(52) U.S. Cl. .................... 349/65; 362/97.2; 362/610

(58) Field of Classification Search ................... 349/65; 362/97.1, 97.2, 610, 612, 617, 619–620
See application file for complete search history.

(56) References Cited

U.S. PATENT DOCUMENTS

2004/0263451 A1* 12/2004 Muto ........................... 345/87
2006/0125978 A1* 6/2006 Hiyama et al. ............... 349/96

* cited by examiner

*Primary Examiner*—Uyen-Chau N Le
*Assistant Examiner*—Kajli Prince
(74) *Attorney, Agent, or Firm*—Antonelli, Terry, Stout & Kraus, LLP.

(57) ABSTRACT

To shorten the distance from a point light source to an effective light emitting area and reduce the size of a back light. A liquid crystal display having a liquid crystal display panel and a back light disposed on the back face of the liquid crystal display panel, wherein the back light has a light guide plate, a point light source disposed on a side face of the light guide plate, and an outgoing light control board disposed on the light guide plate on the side of the liquid crystal display panel, wherein the outgoing light control board has a plurality of convex portions at least partly circular in cross-sectional shape on the surface of the light guide plate, and is disposed on the surface of the light guide plate on the side of the liquid crystal display panel with the convex portions made adherent to the surface of the light guide plate on the side of the liquid crystal display panel, and wherein the convex portions of the outgoing light control board are also formed in an area corresponding to a non-effective area of the back light.

17 Claims, 12 Drawing Sheets

LIQUID CRYSTAL DISPLAY DEVICE

CROSS-REFERENCE TO RELATED APPLICATIONS

The disclosure of Japanese Patent Application No. 2006-155828 filed on Jun. 5, 2006 including the specification, drawings and abstract is incorporated herein by reference in its entirety.

BACKGROUND

1. Field of the Invention

The present invention relates to a liquid crystal display, and more particularly to a technique effectively applied to a back light using a point light source such as a white color light emitting diode (LED: Light Emitting Diode).

2. Description of the Related Arts

Conventionally, in a liquid crystal display module, a back light (light source) is disposed in the rear (on the back face) of a liquid crystal display panel, whereby an image is displayed by applying a light from the light source to the liquid crystal display panel.

In the liquid crystal display module for use in a portable telephone or the like, a point light source such as a white light emitting diode (LED: Light Emitting Diode) is recently used as the light source for the back light to save weight (Patent document 1 (Japanese Patent Laid-open No. 2005-38749)).

Figure 13A:
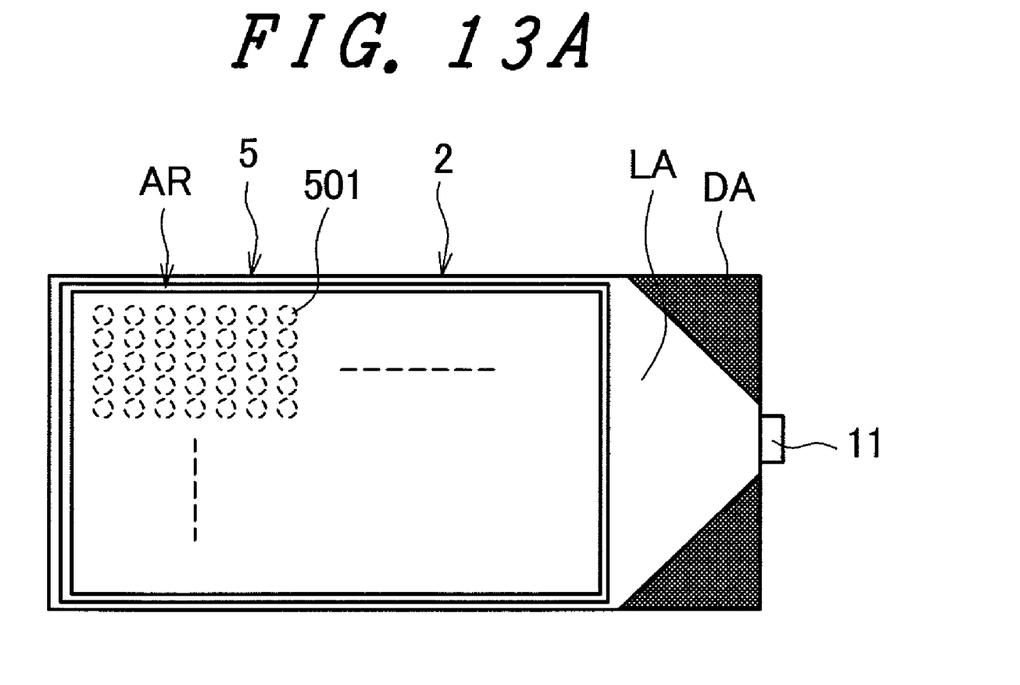
FIG. 13 is a schematic view for explaining the back light using the conventional white light emitting diode.
Figure 13B:
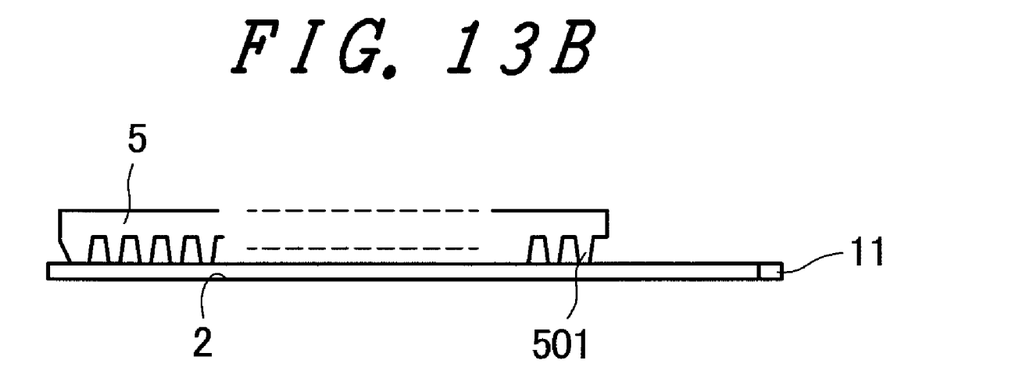
Figure 14A:
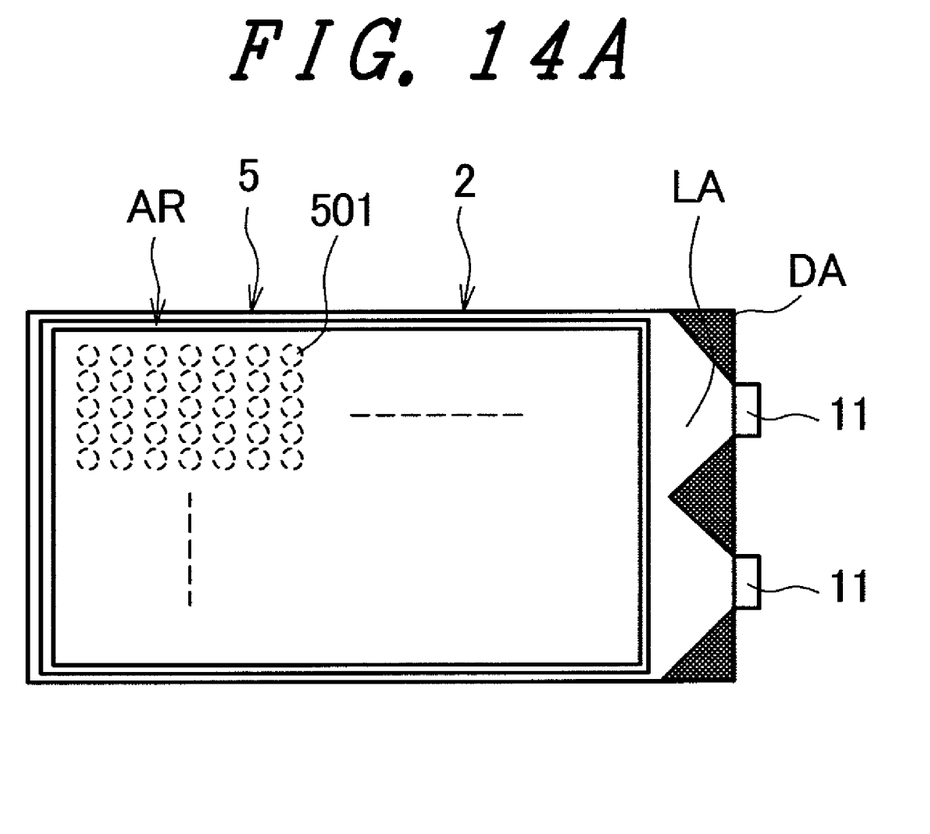
FIG. 14 is a schematic view for explaining the back light using the conventional white light emitting diode.
Figure 14B:
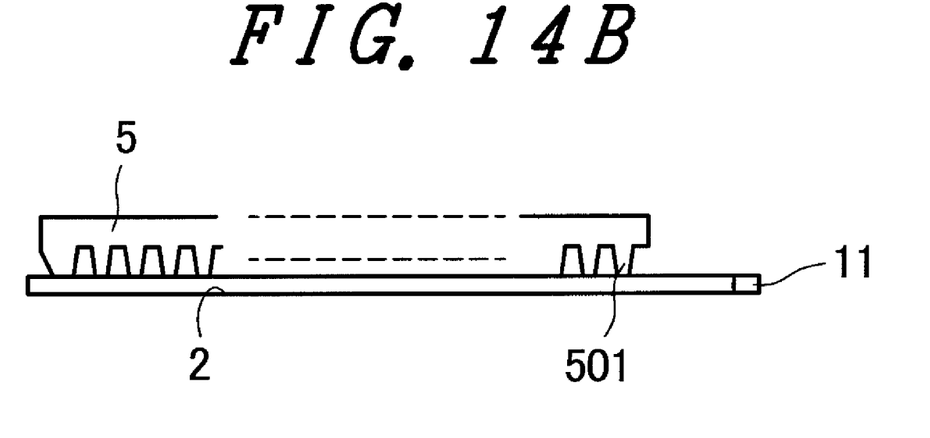

FIGS. 13 and 14 are schematic views for explaining the back light using the conventional white light emitting diode, wherein FIG. 13A is a schematic plan view and FIG. 13B is a side view.

FIG. 13 illustrates the back light having one white light emitting diode, and FIG. 14 illustrates the back light having two white light emitting diodes 11. The back lights of FIGS. 13 and 14 are disclosed in the patent document 1.

Each back light as shown in FIGS. 13 and 14 has the white light emitting diode 11 disposed on the side face of a light guide plate 2 and an outgoing light control board 5 disposed on the surface of the light guide plate 2 on the side of the liquid crystal display panel.

The outgoing light control board 5 has a plurality of convex portions 501, in which each convex portion 501 is at least partly circular in cross-sectional shape.

Also, the present applicant has already made an application for a back light using a white light emitting diode as the light source and a light guide member to reduce the thickness and weight of the back light (patent document 2 (Japanese Patent Application No. 2005-352167)).

Figure 15A:
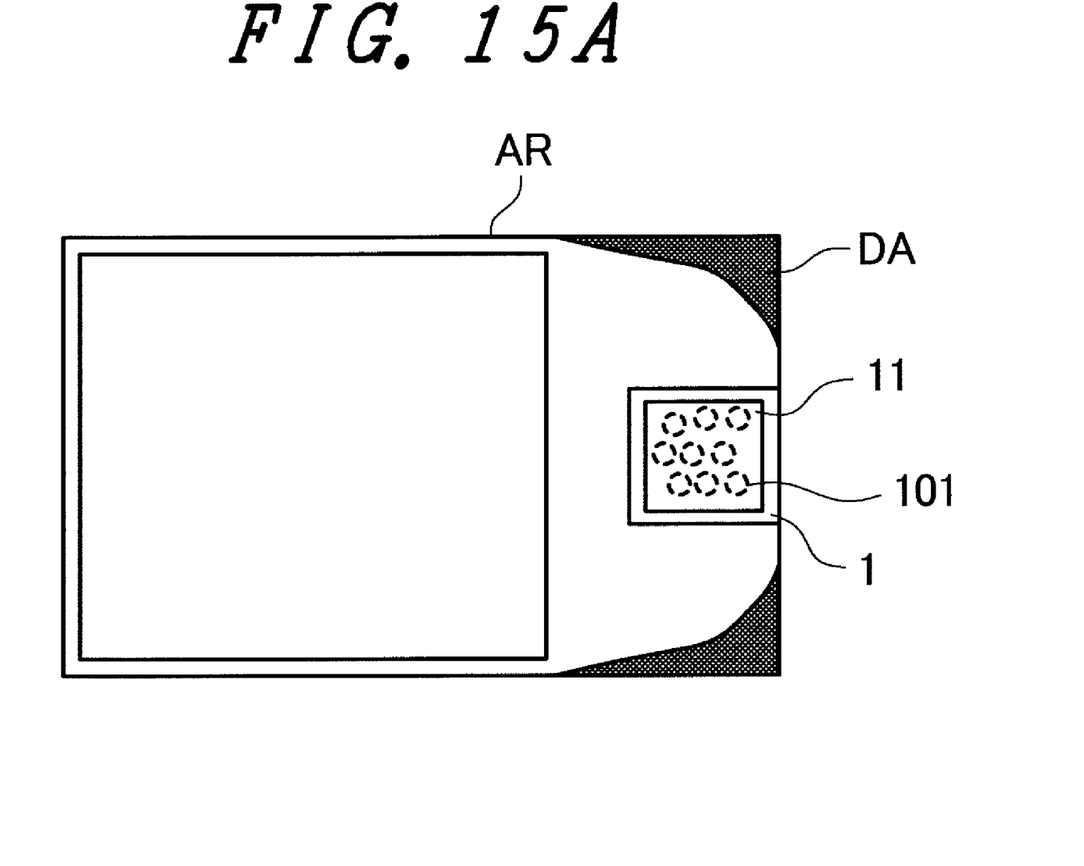
FIG. 15 is a schematic view for explaining another back light using the conventional white light emitting diode.
Figure 15B:
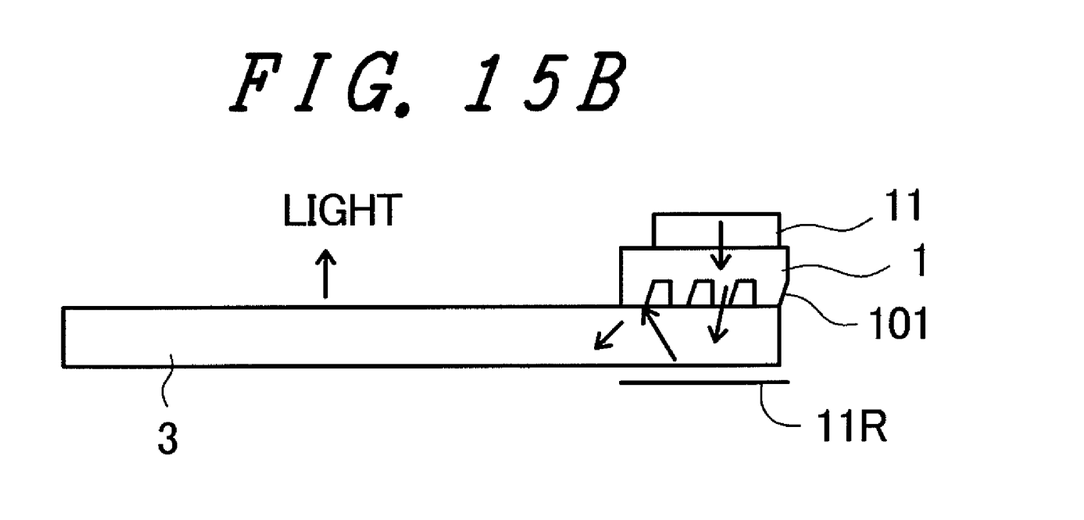

FIG. 15 is a schematic view for explaining another back light using the conventional white light emitting diode, wherein FIG. 15A is a schematic plan view and FIG. 15B is a side view. The back light of FIG. 15 is disclosed in the patent document 1.

The back light of FIG. 15 has a light guide member 3, an incident light adjustment member 1 disposed on the light guide member 3, and a white light emitting diode 11 disposed on the incident light adjustment member 1.

The incident light adjustment member 1 has a plurality of convex portions 101, in which each convex portion 101 is at least partly circular in cross-sectional shape. In FIG. 15, reference sign 11R denotes a rear face reflecting sheet. Also, in FIGS. 13 to 15, reference sign AR denotes an effective light emitting area.

SUMMARY

However, in the back light as shown in FIGS. 13 and 14, a light reaching range is narrow near the white light emitting diode 11 owing to the outgoing angle characteristic of the white light emitting diode 11 and a difference in the refractive index between the air and the light guide plate 2, so that a light area (LA) and a dark area (DA) occur between the effective light emitting area (AR) corresponding to a display area of the liquid crystal display panel and the white light emitting diode 11, as shown in FIGS. 13 and 14.

Therefore, there was a problem that the distance from a light entering portion of the light guide plate 2 to the effective light emitting area actually used as a surface light source had to be increased.

This invention has been achieved to solve the above-mentioned problem with the related art, and it is an object of the invention to provide a technique for allowing the size reduction of the back light by shortening the distance from the point light source to the effective light emitting area in the liquid crystal display.

The foregoing and other objects and novel features of the invention will be apparent from the description of the specification and the accompanying drawings.

The representative inventions as disclosed in this application are briefly outlined as follows.

(1) A liquid crystal display having a liquid crystal display panel and a back light disposed on the back face of the liquid crystal display panel, wherein the backlight has a light guide plate, a point light source disposed on a side face of the light guide plate, and an outgoing light control board disposed on the light guide plate on the side of the liquid crystal display panel, wherein the outgoing light control board has a plurality of convex portions at least partly circular in cross-sectional shape on the surface of the light guide plate, and is disposed on the surface of the light guide plate on the side of the liquid crystal display panel with the convex portions made adherent to the surface of the light guide plate on the side of the liquid crystal display panel, and wherein the convex portions of the outgoing light control board are also formed in an area corresponding to a non-effective area of the back light.

(2) The liquid crystal display according to (1), further comprising a first reflecting sheet disposed in the non-effective area of the back light on the surface of the outgoing light control board on the side of the liquid crystal display panel.

(3) The liquid crystal display according to (1) or (2), further comprising a second reflecting sheet disposed in at least the non-effective area of the back light on the surface of the light guide plate on the opposite side of the liquid crystal display panel.

(4) A liquid crystal display having a display panel and a back light disposed on the back face of the display panel, wherein the back light has a light guide member, an incident light adjustment member disposed in a non-effective area of the back light on a surface of the light guide plate on the side of the liquid crystal display panel, and a point light source disposed on the incident light adjustment member, and wherein the incident light adjustment member has a plurality of convex portions at least partly circular in cross-sectional shape on a surface of the light guide member, and is disposed on the surface of the light guide member on the side of the liquid crystal display panel with the convex portions made adherent to the surface of the light guide member on the side of the liquid crystal display panel.

(5) The liquid crystal display according to (4), further comprising a rear face reflecting sheet disposed in the non-effective area of the back light on the surface of the light guide member on the opposite side of the liquid crystal display panel.

(6) The liquid crystal display according to (4), wherein the light guide member has a translucent member formed in an area outside an area where the incident light adjustment member is disposed on a surface on the side of the liquid crystal display panel, and a reflecting member formed on the surface on the opposite side of the liquid crystal display panel, in which the refractive index of the translucent member is smaller than the refractive index of the light guide member.

(7) A liquid crystal display having a display panel and a back light disposed on the back face of the display panel, wherein the back light has a light guide member, an incident light adjustment member disposed in a non-effective area of the back light on a surface of the light guide member on the opposite side of the liquid crystal display panel, and a point light source disposed on the incident light adjustment member, and wherein the incident light adjustment member has a plurality of convex portions at least partly circular in cross-sectional shape on a surface of the light guide member, and is disposed on the surface of the light guide member on the opposite side of the liquid crystal display panel with the convex portions made adherent to the surface of the light guide member on the opposite side of the liquid crystal display panel.

(8) The liquid crystal display according to (7), further comprising a rear face reflecting sheet disposed in the non-effective area of the back light on the surface of the light guide member on the side of the liquid crystal display panel.

(9) The liquid crystal display according to (7) or (8), wherein the light guide member has a translucent member formed on a surface on the side of the liquid crystal display panel, and a reflecting member formed in an area outside an area where the incident light adjustment member is disposed on the surface on the opposite side of the liquid crystal display panel, in which the refractive index of the translucent member is smaller than the refractive index of the light guide member.

(10) The liquid crystal display according to any one of (4) to (9), further comprising a front face reflecting sheet disposed in an area excluding an area where the point light source is disposed on the surface of the incident light adjustment member where the point light source is disposed.

(11) The liquid crystal display according to (6), (9) or (10), wherein a polarizing reflecting member is used instead of the translucent member, and a transmission axis of the polarizing reflecting member is provided on a surface of the display panel opposed to the back light, and has the same direction as a transmission axis of a polarizer.

(12) The liquid crystal display according to any one of (4) to (11), further comprising an outgoing light control board disposed in an area corresponding to an effective light emitting area of the back light on a surface of the light guide member on the side of the liquid crystal display panel, wherein the outgoing light control board has a plurality of convex portions at least partly circular in cross-sectional shape on a surface of the light guide member, and is disposed on the surface of the light guide member on the side of the liquid crystal display panel with the convex portions made adherent to the surface of the light guide member on the side of the liquid crystal display panel.

(13) The liquid crystal display according to (12), wherein the incident light adjustment member and the outgoing light control board are integrally formed.

The effect obtained by the representative inventions as disclosed in this application is briefly described as follows.

With the liquid crystal display of the invention, the distance from the point light source to the effective light emitting area can be shortened to reduce the size of the back light.

DETAILED DESCRIPTION OF THE INVENTION

The embodiments of the present invention will be described below with reference to the drawings.

Throughout the drawings for explaining the embodiments, the same or like parts are designated by the same numerals or signs and not described repeatedly.

Embodiment 1

Figure 1A:
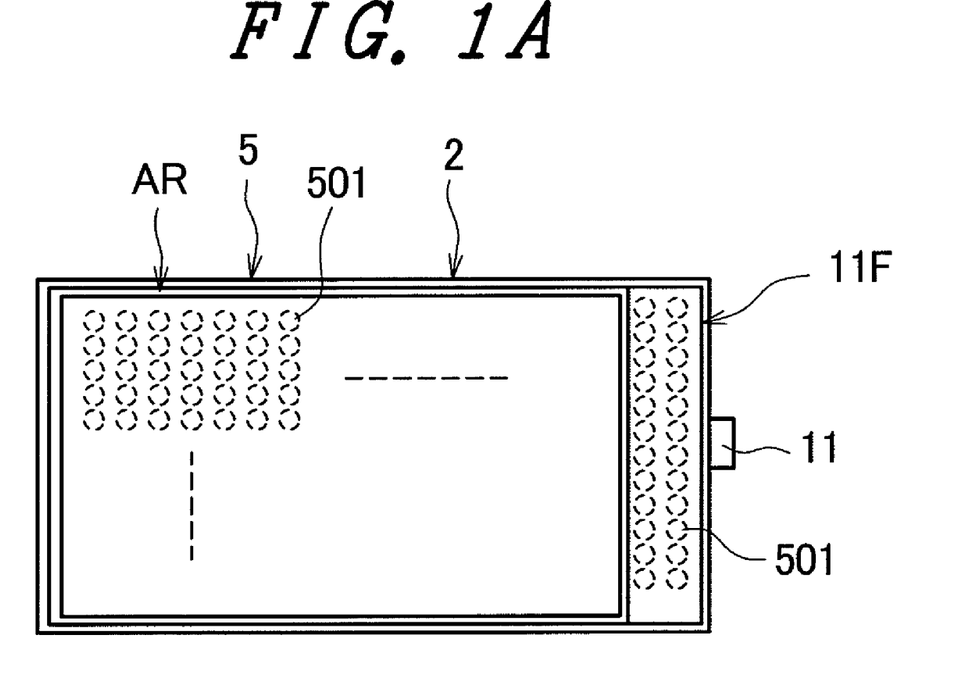
FIG. 1 is a view showing the schematic constitution of a back light for use in a liquid crystal display according to an embodiment 1 of the present invention.
Figure 1B:
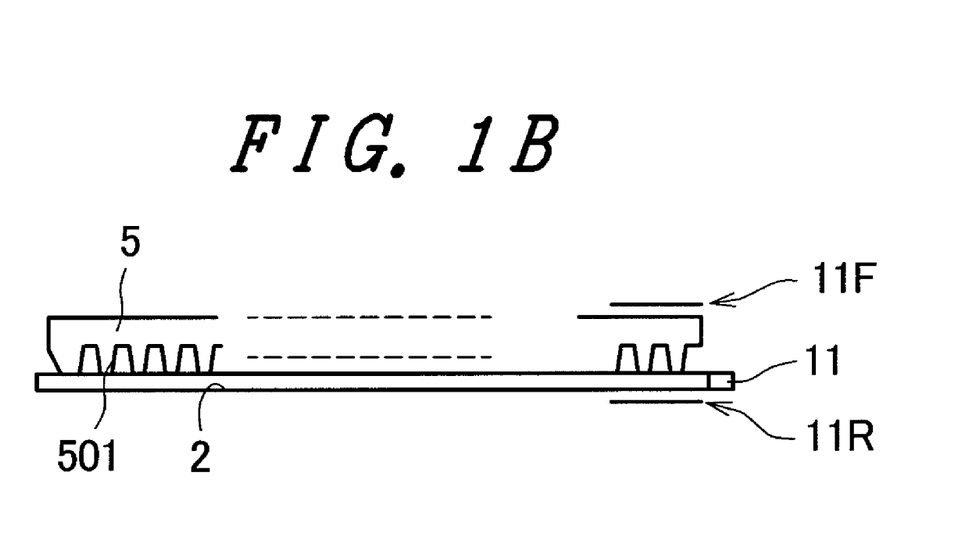

FIG. 1 is a view showing the schematic constitution of a back light for use in a liquid crystal display according to an embodiment 1 of the invention, wherein FIG. 1A is a schematic plan view and FIG. 1B is a side view.

The back light of this embodiment has a white light emitting diode 11 (a point light source of the invention) disposed on a side face of a light guide plate 2 and an outgoing light control board 5 disposed on a surface of the light guide plate 2 on the side of the liquid crystal display panel.

The outgoing light control board 5 has a plurality of convex portions 501, in which each convex portion 501 is columnar and at least partly circular in cross-sectional shape. And the outgoing light control board 5 is disposed on the light guide plate 2 with the convex portions 501 made adherent to the light guide plate 2.

Also, the liquid crystal display panel is disposed on the outgoing light control board 5, though not shown in FIG. 1.

In this embodiment, the outgoing light control board 5 is extended up to a non-effective area near a light entry portion of the light guide plate 2, and the convex portions 501 are formed in a portion on the surface of the light guide plate 2, extended up to the non-effective area near the light entry portion of the light guide plate 2. The white reflecting sheets (11F, 11R) are disposed under the light guide plate 2 and above the outgoing light control board 5 in this area.

Herein, the non-effective area means the area other than an effective light emitting are (AR) (i.e., area corresponding to the display area of the liquid crystal display panel) of the back light.

Figure 2:
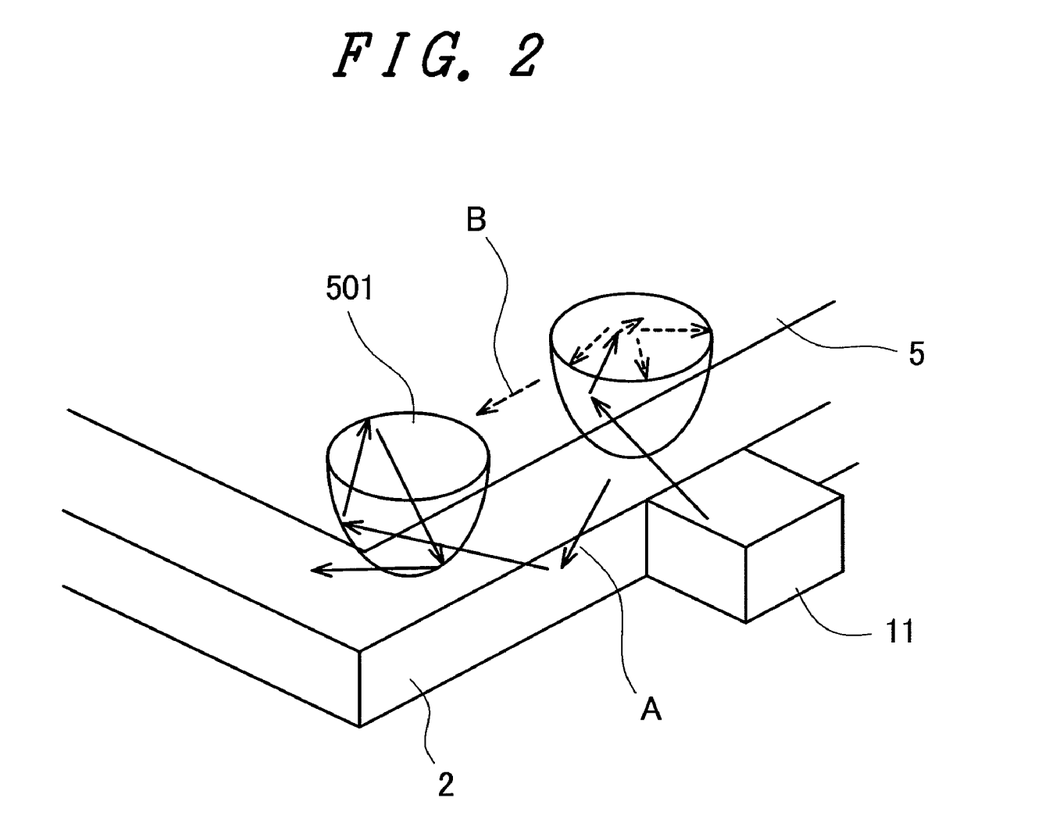
FIG. 2 is a view for explaining the effect of the embodiment 1 of the invention.

FIG. 2 is a view for explaining the effect with a structure of this embodiment.

(1) Apart of light outgoing from the white light emitting diode 11 passes through the light guide plate 2 to the convex portion 501 in the non-effective area of the outgoing light control board 5, and is reflected from a wall face of the convex portion 501 to reach the reflecting sheet 11F provided on top of it, as shown in FIG. 2.

Since the reflecting sheet 11F is a white reflecting sheet, the light is irregularly reflected, and diffused and reflected in various directions to enter the outgoing light control board 5 again.

(2) Apart of the light entering the outgoing light control board 5 again passes through the convex portion 501 again to enter the light guide plate 2, and another light is emergent from the lower face of the outgoing light control board 5 to enter the light guide plate 2, as shown in FIG. 2A. Moreover, the still other part propagates through the outgoing light control board 5, as shown in FIG. 2B.

(3) Since the reflecting sheet 11R is provided on the lower face of the light guide plate 2, the light entering the light guide plate 2 again at (2) is diffusely reflected and propagated.

(4) Apart of the light propagated through the light guide plate 2 or the non-effective area of the outgoing light control board 5 is reflected from the convex portion 501 of the outgoing light control board 5 in the non-effective area to the effective light emitting area (AR).

Thus, in this embodiment, since the light reaches the non-effective area as well, and further the light is reflected toward the effective light emitting area (AR), the back light having highly uniform luminance can be realized even if the distance from the white light emitting diode 11 to the effective light emitting area (AR) is shortened.

Embodiment 2

Figure 3A:
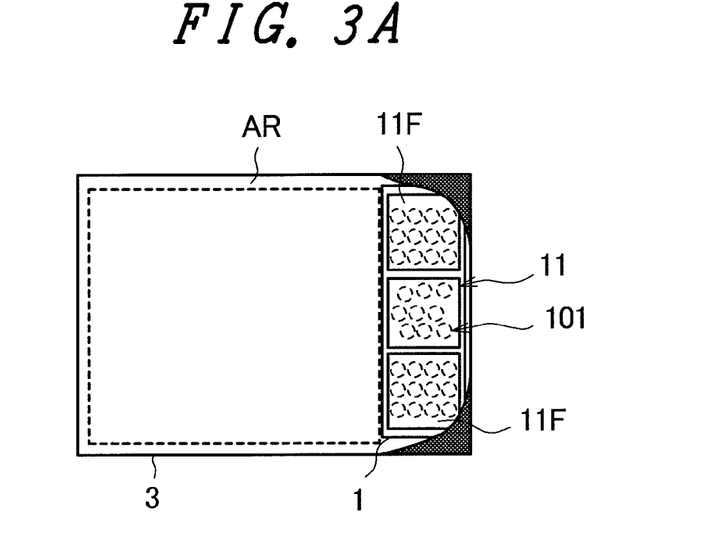
FIG. 3 is a view showing the schematic constitution of a back light for use in a liquid crystal display according to an embodiment 2 of the invention.
Figure 3B:
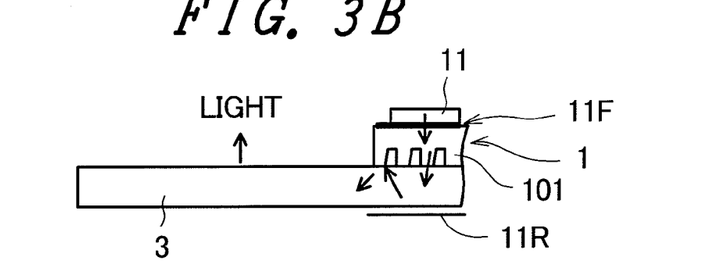

FIG. 3 is a view showing the schematic constitution of a back light for use in a liquid crystal display according to an embodiment 2 of the invention, wherein FIG. 3A is a schematic plan view and FIG. 3B is a side view.

The back light of this embodiment has a light guide member 3, an incident light adjustment member (incident light adjustment member of this embodiment) 1 disposed on the light guide member 3, and a white light emitting diode 11 (a point light source of the invention) disposed on the incident light adjustment member 1.

The incident light adjustment member 1 has a plurality of convex portions 101, in which each convex portion 101 is columnar and at least partly circular in cross-sectional shape. And the incident light adjustment member 1 is disposed on the light guide member 3 with the convex portions 101 made adherent to the light guide member 3.

A liquid crystal display panel, though not shown in FIG. 3, is disposed on the surface of the light guide member 3 on the side where the incident light adjustment member 1 is disposed.

In this embodiment, the incident light adjustment member 1 is provided over the entire non-effective area, and further the white reflecting sheets (11F, 11R) are disposed under the light guide member 1 and above the incident light adjustment member 1 in this non-effective area.

Herein, the non-effective area means the area other than an effective light emitting are (AR) (i.e., area corresponding to the display area of the liquid crystal display panel) of the back light.

In this embodiment, like the embodiment 1, the light is propagated through the non-effective area of the light guide member 1 owing to the convex portion 101 in the non-effective area of the incident light adjustment member 1, and further reflected toward the effective light emitting area (AR), whereby a surface light source having highly uniform luminance can be realized even if the distance from the white light emitting diode 11 to the effective light emitting area (AR) is shortened.

Figure 4:
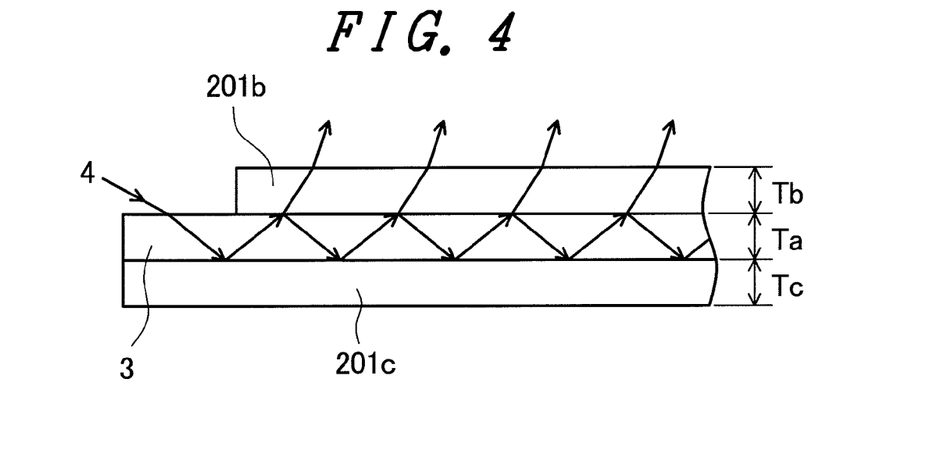
FIG. 4 is a view for explaining the structure of a variation of the back light according to the embodiment 2 of the invention.

FIG. 4 is a view for explaining the structure of a variation of the back light of this embodiment.

The back light as shown in FIG. 4 is formed with a translucent member 201b and a reflecting member 201c on both sides of the light guide member 3. At this time, the translucent member 201b is made of a material having the refractive index smaller than the refractive index of the light guide member 3.

Also, the light guide member 3, the translucent member 201b and the reflecting member 201c are preferably film-like members.

The thickness Ta of the light emitting member 3 is 0.25 mm or less, for example. Also, the thickness Tb of the translucent member 201b and the thickness Tc of the reflecting member 201c each are 0.5 mm or less, for example.

And if the light 4 is incident from an end portion of the surface of the light guide member 3 opposed to the display panel 1, the incident light 4 is repetitively reflected from an interface with the translucent member 201b and an interface with the reflecting member 201c to propagate through the light guide member, as shown in FIG. 4.

At this time, in a relation between the refractive index of the light guide member 3 and the refractive index of the translucent member 201b, the light having a shallow angle, in other words, a large incident angle on the translucent member 201b is reflected from the interface with the translucent member 201b.

On the other hand, a light having a deep angle, in other words, a small incident angle on the translucent member 201b, is refracted on the interface to go out in a direction of the display panel 1.

The light reflected from the interface with the translucent member 201b is reflected from the interface with the reflecting member 201c, and enters the interface with the translucent member 201b again. After the light is propagated through the light guide member 3 by repeating this operation, the light 4 incident on the light guide member 3 is converted into surface light, and applied from the effective light emitting area (AR) to the liquid crystal display panel.

Figure 5:
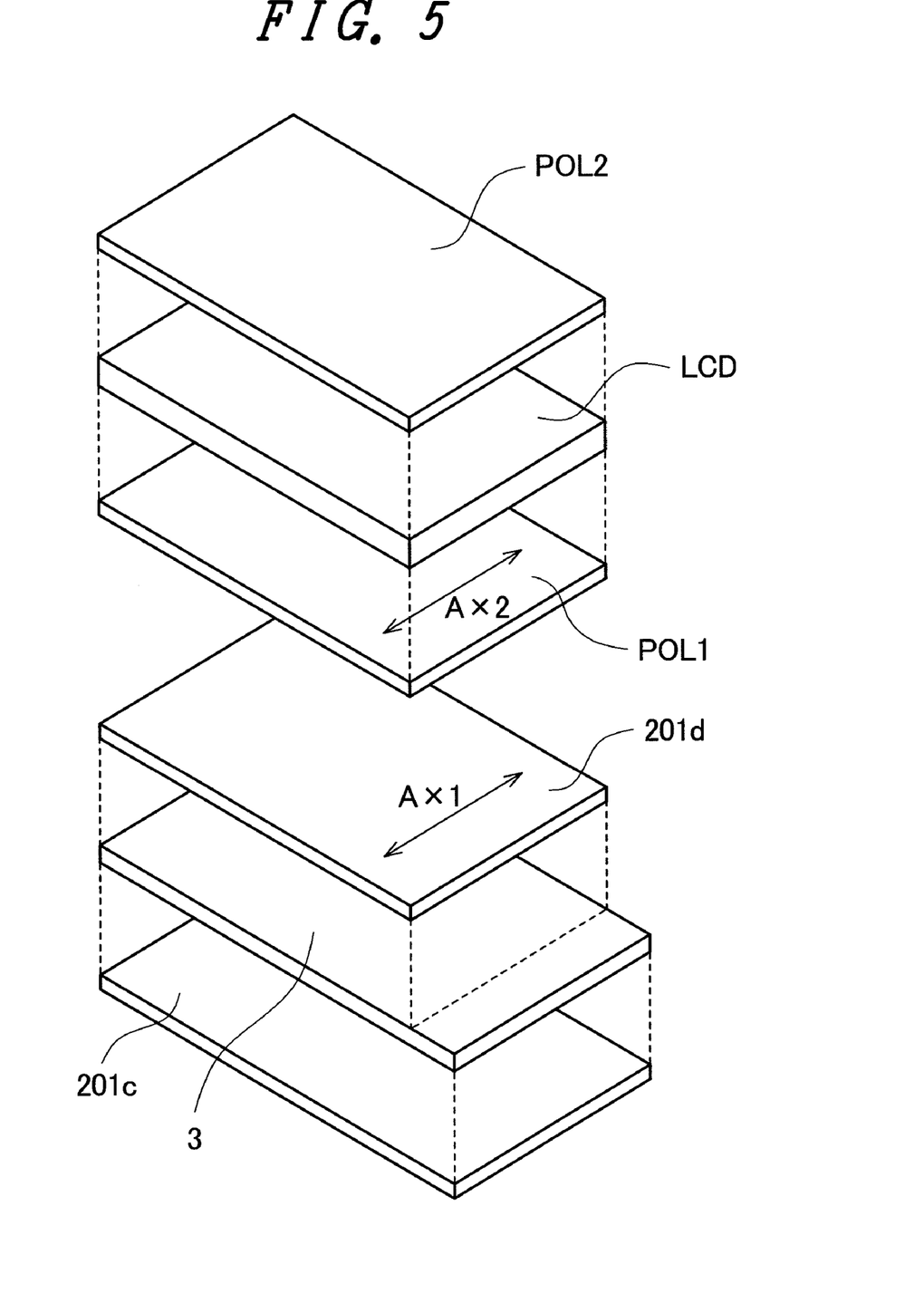
FIG. 5 is a view for explaining the structure of another variation of the back light according to the embodiment 2 of the invention.

FIG. 5 is a view for explaining the structure of another variation of the back light of this embodiment.

In FIG. 5, LCD denotes a liquid crystal display panel. The liquid crystal display panel (LCD) is fabricated by bonding a glass substrate (called a TFT substrate) on which a thin film transistor (TFT) and a pixel electrode are formed and a glass substrate (called a CF substrate) on which a light shield membrane and a color filter are formed with a sealant, and injecting the liquid crystal between two glass substrates and sealing. POL1 and POL2 each denote a polarizer disposed outside the glass substrate.

The back light as shown in FIG. 5 employs a polarizing reflecting member (polarizing reflecting sheet) 201d, instead of the translucent member 201b as shown in FIG. 4.

Herein, a transmission axis (arrow AX2 of FIG. 5) of the polarizer (POL1) and a transmission axis (arrow AX1 of FIG. 5) of the polarizing reflecting member 201d are in the same direction.

The polarizing reflecting member 201d is the member for transmitting only a component of the incident light of which the plane of polarization is oriented in a certain direction, and reflecting the remaining component. Therefore, only a component of the light propagating through the light guide member 3, consistent with the transmission axis (polarization axis) of the polarizing reflecting member 201d, is transmitted through the polarizing reflecting member 201d to enter the liquid crystal display panel. And the remaining component is reflected and continues to propagate through the light guide member 3.

The light reflected from the interface with the polarizing reflecting member 201d is reflected from the interface with the reflecting member 201c to enter the interface with the polarizing reflecting member 201d again. After the light is propagated through the light guide member 3 by repeating this operation, the light 4 incident on the light guide member 3 is converted into surface light to enter the liquid crystal display panel.

Figure 6:
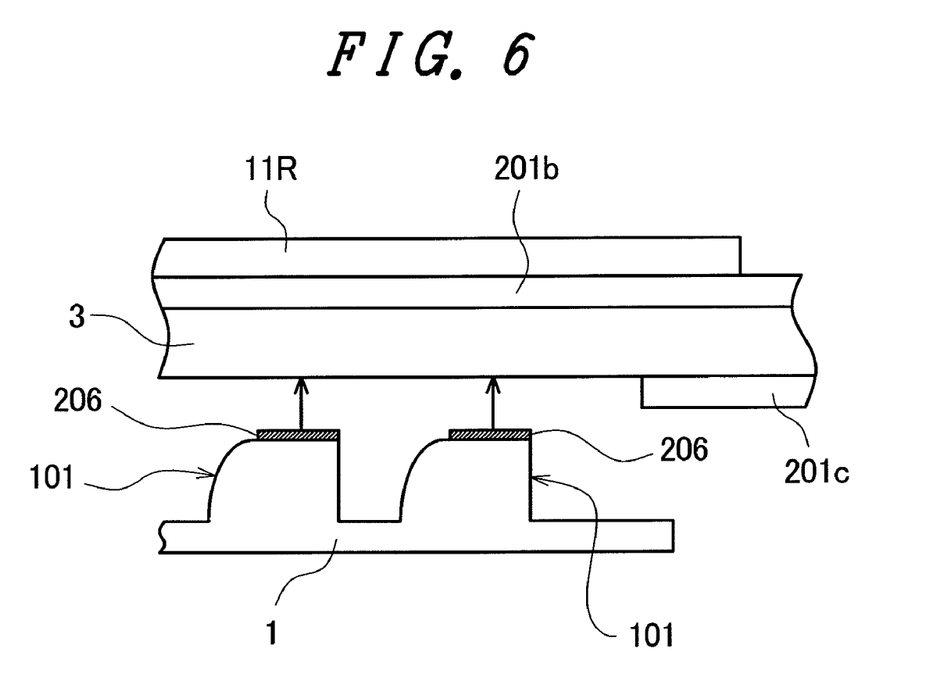
FIG. 6 is a typical view for explaining a method for attaching an incident light adjustment member according to the embodiment 2 of the invention.

FIG. 6 is a typical view for explaining a method for attaching the incident light adjustment member 1 according to this embodiment.

A plurality of convex portions 101 are formed on a surface of the incident light adjustment member 1 on the opposite side of the light guide member 3.

The convex portion 101 of this incident light adjustment member 1 has a flat and facial top end, and made adherent to the light guide member 3. As will be clear from FIG. 6, the convex portion 101 is at least partly circular in cross-sectional shape.

In order to cause the top end face of the convex portion 101 to adhere to the light guide member 3, the top end face of the convex portion 101 may be bonded with the light guide member 3 by an optical adhesive 206 applied on the top end face of the convex portion 101. Also, the convex portion 101 may be a projection of columnar shape.

Also, a reflecting sheet 11R, which is superposed on the incident light adjustment member 1, is disposed on the surface of the light guide member 3 where the translucent member 201b is formed.

Figure 7:
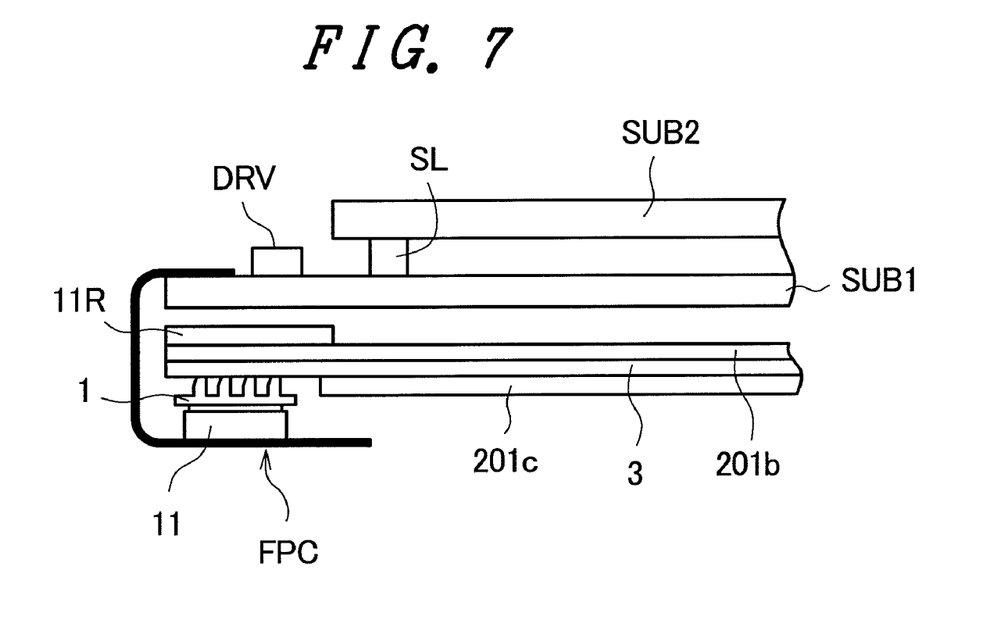
FIG. 7 is a typical view for explaining a method for attaching the back light having a light guide member as shown in FIG. 4.

FIG. 7 is a typical view for explaining a method for attaching the back light having the light guide member 1 as shown in FIG. 4. Also, FIG. 8 is a typical view for explaining another method for attaching the back light having the light guide member 1 as shown in FIG. 4.

Figure 8:
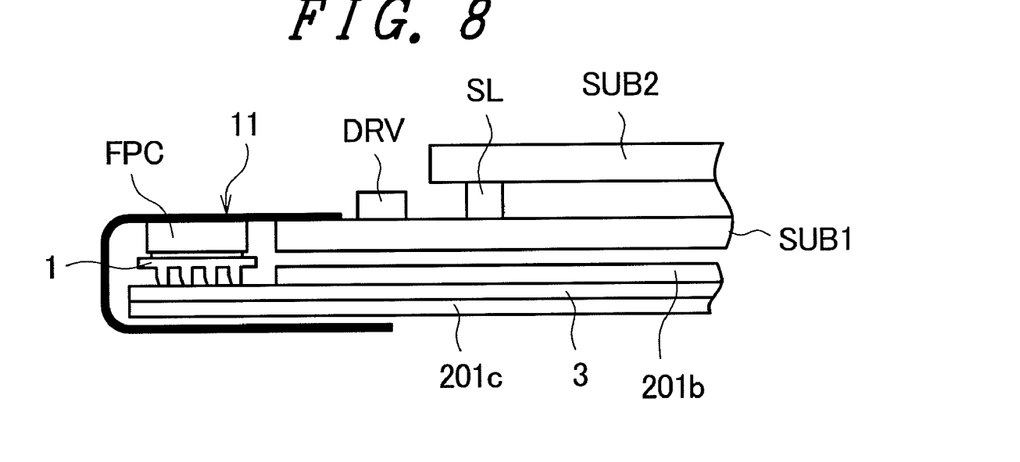
FIG. 8 is a typical view for explaining another method for attaching the back light having the light guide member as shown in FIG. 4.

In FIGS. 7 and 8, SUB1 and SUB2 denote glass substrates, and SL denotes a sealant. The polarizers (POL1, POL2), though not shown in the figures, are disposed outside the glass substrates (SUB1, SUB2).

The glass substrate (SUB1) mounts a semiconductor chip (DRV) making up a driver and a flexible circuit board (FPC). Also, the white light emitting diode 11 is mounted on the flexible circuit board (FPC).

The method as shown in FIG. 7 involves an instance where the incident light adjustment member 1 is disposed on the light guide member 3 on the opposite side of the liquid crystal display panel, in which the reflecting member 201c in the non-effective area of the light guide member 3 is removed, and the incident light adjustment member 1 and the white light emitting diode 11 are disposed in this removed portion. Also, the reflecting sheet 11R, which is superposed on the incident light adjustment member 1, is disposed on the surface of the light guide member 3 where the translucent member 201b is formed.

In this arrangement, the incident light adjustment member 1 may be superposed partially or totally on the liquid crystal display panel. Therefore, an area outside the display area of the liquid crystal display module, or a so-called frame area, can be reduced.

The method as shown in FIG. 8 involves an instance where the incident light adjustment member 1 is disposed on the light guide member 3 on the side of the liquid crystal display panel, in which the translucent member 201b in the non-effective area of the light guide member 3 is removed, and the incident light adjustment member 1 and the white light emitting diode 11 are disposed in this removed portion. Also, the reflecting member 201c of the light guide member 3 is formed up to a portion superposed on the incident light adjustment member 1, whereby the reflecting member 201c also serves as the reflecting sheet 11R as previously described.

Embodiment 3

Figure 9A:
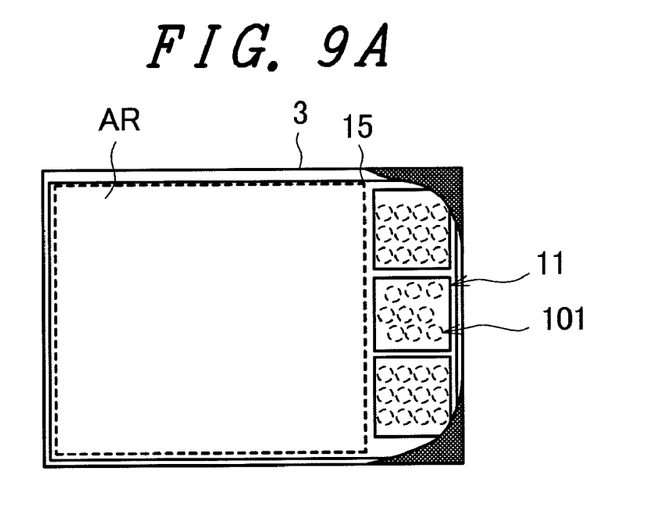
FIG. 9 is a view showing the schematic constitution of a back light for use in a liquid crystal display according to an embodiment 3 of the invention.
Figure 9B:
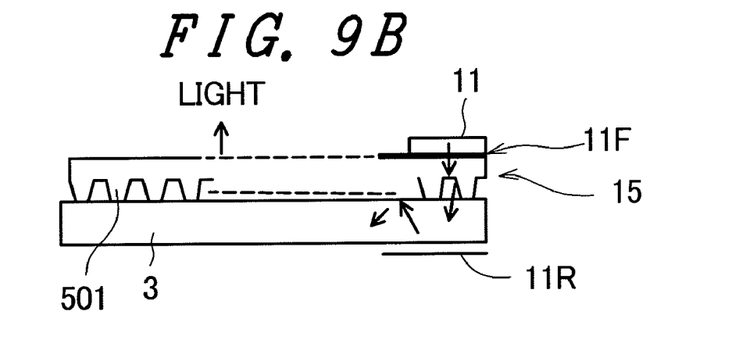

FIG. 9 is a view showing the schematic constitution of a back light for use in a liquid crystal display according to an embodiment 3 of the invention, wherein FIG. 9A is a schematic plan view and FIG. 9B is a side view.

The back light of this embodiment employs an incident light adjustment member/outgoing light control board 15 in which the outgoing light control board 5 and the incident light adjustment member 1 are integrated.

In the back light of this embodiment, a surface light source having highly uniform luminance can be realized even if the distance from the white light emitting diode 11 to the effective light emitting area (AR) is shortened. Further, since the outgoing light control board 5 and the incident light adjustment member 1 are integrated, the high efficiency is attained and the assembling capability is improved.

Figure 10A:
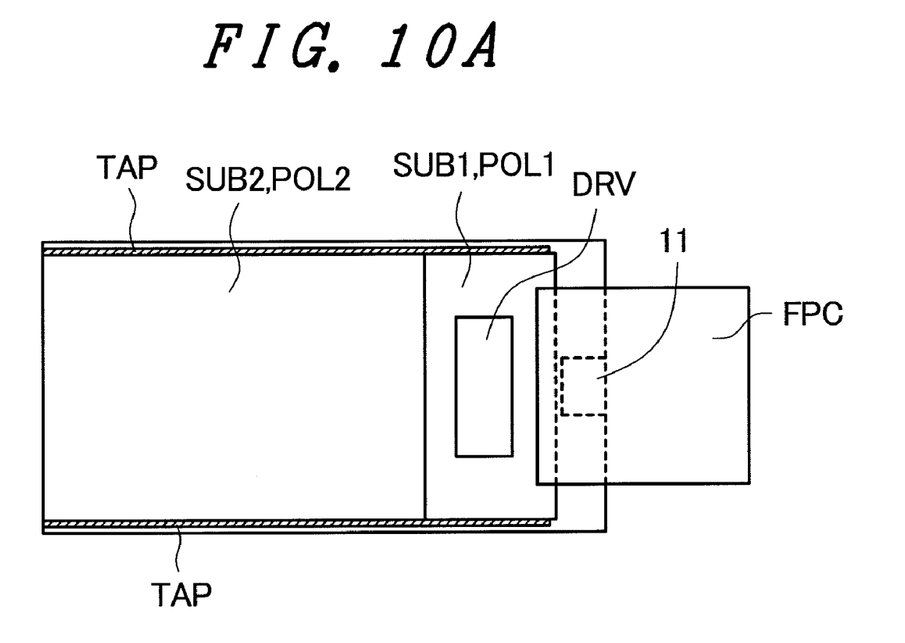
FIG. 10 is a view showing the schematic constitution of a liquid crystal display module applying the back light as shown in FIG. 9.
Figure 10B:
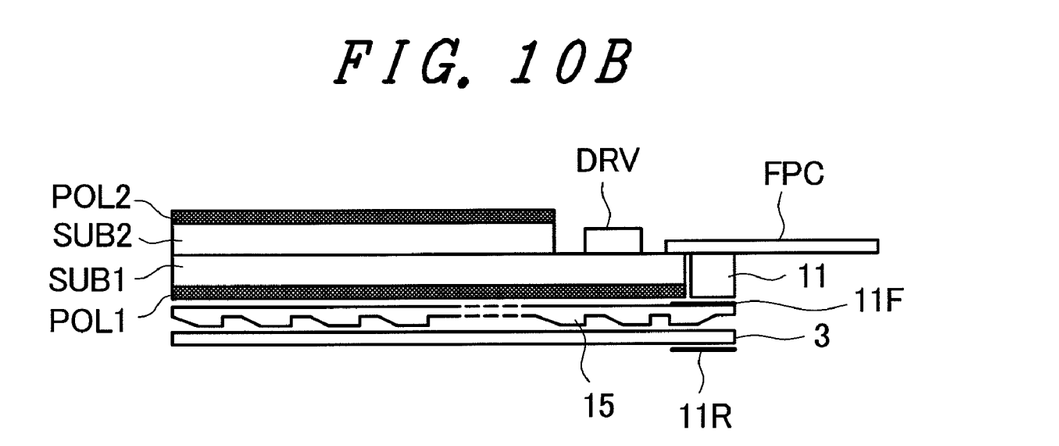

FIG. 10 is a view showing the schematic constitution of the liquid crystal display module applying the back light as shown in FIG. 9, wherein FIG. 10A is a schematic plan view and FIG. 10B is a side view.

In FIG. 10, SUB1 and SUB2 denote the glass substrates, POL1 and POL2 denote the polarizers, DRV denotes a semiconductor chip, FPC denotes a flexible circuit board, reference numeral 3 denotes the light guide member, 11F and 11R denote the reflecting sheets, reference numeral 11 denotes the white light emitting diode, reference numeral 15 denotes the incident light adjustment member/outgoing light control board, and TAP denotes a double-faced tape for bonding the liquid crystal display panel and the back light.

The glass substrate (SUB1) mounts a semiconductor chip (DRV) making up a driver and a flexible circuit board (FPC). Also, the white light emitting diode 11 is mounted on the flexible circuit board (FPC).

Figure 11A:
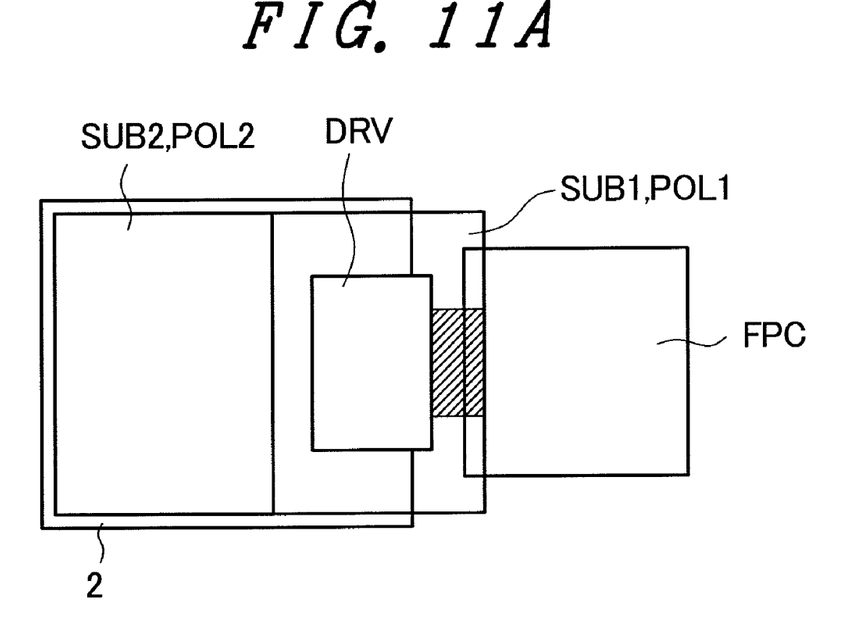
FIG. 11 is a view showing the schematic constitution of the conventional liquid crystal display module.
Figure 11B:
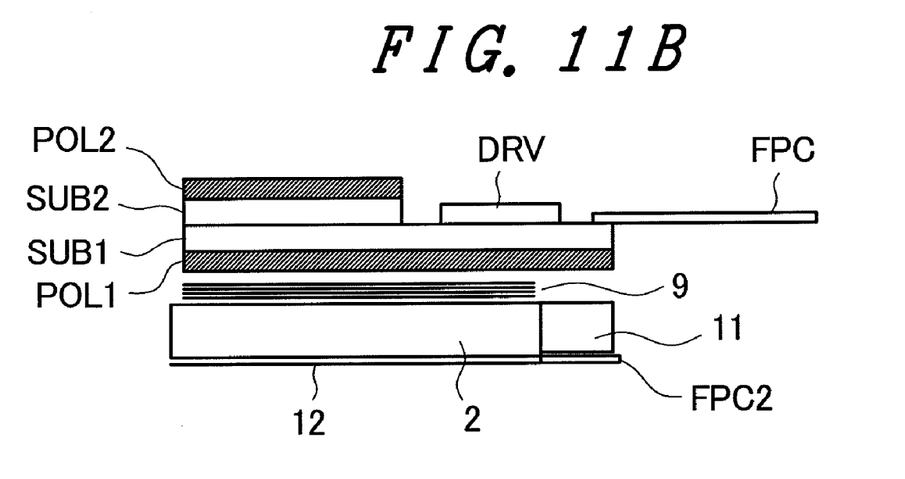

In contrast, the schematic constitution of the conventional liquid crystal display module is shown in FIG. 11. FIG. 11A is a schematic plan view and FIG. 11B is a side view.

In FIG. 11, SUB1 and SUB2 denote the glass substrates, POL1 and POL2 denote the polarizers, DRV denotes a semiconductor chip, FPC and FPC2 denote the flexible circuit boards, reference numeral 2 denotes the light guide plate, reference numeral 11 denotes the white light emitting diode, reference numeral 9 denotes an optical sheet group (upper diffusing sheet, two lens sheets, lower diffusing sheet), and reference numeral 12 denotes a reflector. Herein, the white light emitting diode 11 is mounted on the flexible circuit board (FPC2).

As will be clear from comparison between FIG. 10 and FIG. 11, the liquid crystal display module of this embodiment can be made thinner.

In this embodiment, the outgoing light control board 5 and the incident light adjustment member 1 may be independently provided. A constitution in this case is shown in FIG. 12.

Figure 12:
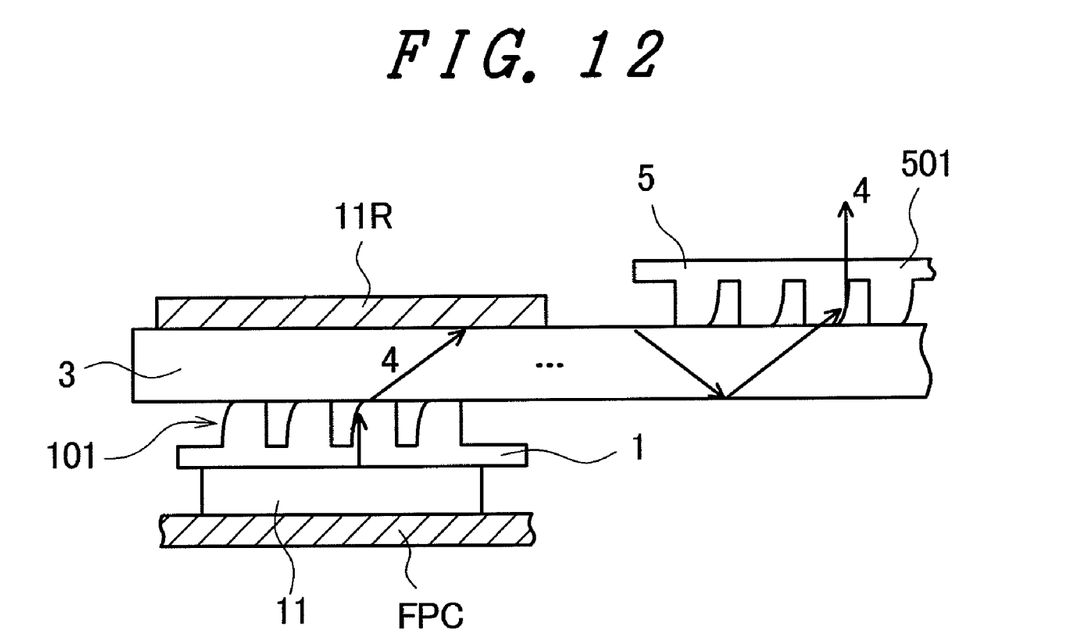
FIG. 12 is an essential cross-sectional view showing the schematic constitution of a variation of the back light for use in the liquid crystal display according to the embodiment 3 of the invention.

FIG. 12 is an essential cross-sectional view showing the schematic constitution of a variation of the back light for use in the liquid crystal display according to the embodiment 3 of the invention.

The back light as shown in FIG. 12 is provided with the outgoing light control board 5 on the light guide member 3 on the side of the liquid crystal display panel, and formed with the incident light adjustment member 1 on the light guide member 3 on the opposite side of the liquid crystal display panel. In FIG. 12, 11R denotes a reflecting sheet, and FPC denotes a flexible circuit board on which the white light emitting diode 11 is mounted.

The outgoing light control board 5 is the member for adjusting the outgoing angle of the light outgoing from the light guide member 3 and applied on the liquid crystal display panel, as previously described.

This outgoing light control board 5 has the same constitution as the incident light adjustment member 1, and has a plurality of convex portions 501 on the surface opposed to the light guide member 3, in which the top end face of the convex portion 501 is made adherent to the light guide member 3.

To cause the top end face of the convex portion 501 of the outgoing light control board 5 to adhere to the light guide member 3, the top end face of the convex portion 501 may be bonded with the light guide member 3 by an optical adhesive applied on the top end face of the projection, for example.

Also, the convex portion 501 of the outgoing light control board 5 is columnar and at least partly circular in cross section.

In the back light of FIG. 12, the translucent member 201b or polarizing reflecting member 201d and the reflecting member 201c are not employed. Since the refractive index of the light guide member 3 is greater than the refractive index of the air, the light 4 passing through the incident light adjustment member 1 to be incident on the light guide member 3 is totally reflected repeatedly from the interface between the light guide member 3 and the air, and propagated through the light guide member 3.

At this time, since the refractive index is almost equal in a portion where the convex portion 501 of the outgoing light control board 5 and the light guide member 3 are contacted, the total reflection does not occur, so that the light 4 directly proceeds through the convex portion 501 of the outgoing light control board 5. And the light 4 entering the convex portion 501 is reflected from the interface between the side face of the convex portion 501 and the air to go out in a direction toward the liquid crystal display panel.

Though in the above embodiments, one white light emitting diode 11 is provided, the invention is not limited thereto, but two or more white light emitting diodes 11 may be disposed.

While the invention made by the present inventor has been specifically described above based on the embodiments, the invention is not limited to these embodiments, but various changes may be made without departing from the spirit or scope of the invention.

The invention claimed is:

1. A liquid crystal display device having a liquid crystal display panel and a back light disposed on the back face of said liquid crystal display panel;
    wherein said back light has a light guide plate, a point light source disposed on a side face of said light guide plate, and an outgoing light control board disposed on said light guide plate on the side of said liquid crystal display panel;
    wherein said outgoing light control board has a plurality of columnar convex portions at least partly circular in cross-sectional shape in a plane extending substantially perpendicular to a major surface of said light guide plate and substantially circular in cross-sectional shape in a plane extending substantially parallel to the major surface of said light guide plate on a surface of said outgoing light control board facing the major surface of said light guide plate, and is disposed on the major surface of said light guide plate on the side of said liquid crystal display panel with said columnar convex portions made adherent to the major surface of said light guide plate on the side of said liquid crystal display panel; and
    wherein said columnar convex portions of said outgoing light control board are formed in a matrix shape and also formed in an area corresponding to a non-effective area between an effective light emitting area for said liquid crystal display panel and said point light source.

2. The liquid crystal display device according to claim 1, further comprising a first reflecting sheet disposed in said non-effective area of said back light on an opposite surface of said outgoing light control board on the side of said liquid crystal display panel.

3. The liquid crystal display device according to claim 2, further comprising a second reflecting sheet disposed in at least said non-effective area of said back light on an opposite surface of said light guide plate on the opposite side of said liquid crystal display panel.

4. A liquid crystal display device having a liquid crystal display panel and a back light disposed on the back face of said liquid crystal display panel,
    wherein said back light has a light guide member, an incident light adjustment member disposed in a non-effective area of said back light on a surface of said light guide member on the side of said liquid crystal display panel, and a point light source disposed on said incident light adjustment member;
    wherein said incident light adjustment member has a plurality of columnar convex portions at least partly circular in cross-sectional shape in a plane extending substantially perpendicular to a major surface of said light guide plate and substantially circular in cross-sectional shape in a plane extending substantially parallel to the major surface of said light guide plate on a surface of said outgoing light control board facing the major surface of said light guide member, and is disposed on the major surface of said light guide member on the side of said liquid crystal display panel with said columnar convex portions made adherent to the major surface of said light guide member on the side of said liquid crystal display panel; and wherein said columnar convex portions of said outgoing light control board are formed in a matrix shape and formed in an area corresponding to a non-effective area between an effective light emitting area for said liquid crystal display panel and said point light source.

5. The liquid crystal display device according to claim 4, further comprising a rear face reflecting sheet disposed in said non-effective area of said back light on the an opposite surface of said light guide member on the opposite side of said liquid crystal display panel.

6. The liquid crystal display device according to claim 4, wherein said light guide member has a translucent member formed in an area outside an area where said incident light adjustment member is disposed on a surface on the side of said liquid crystal display panel, and a reflecting member formed on a surface on the opposite side of said liquid crystal display panel, in which the refractive index of said translucent member is smaller than the refractive index of said light guide member.

7. The liquid crystal display device according to claim 6, wherein a polarizing reflecting member is used instead of said translucent member, and a transmission axis of said polarizing reflecting member is provided on a surface of said display panel opposed to said back light, and has the same direction as a transmission axis of a polarizer.

8. The liquid crystal display device according to claim 4, further comprising another outgoing light control board disposed in an area corresponding to the effective light emitting area of said liquid crystal display panel on the major surface of said light guide member on the side of said liquid crystal display panel, wherein said another outgoing light control board has a plurality of other columnar convex portions at least partly circular in cross-sectional shape in a plane extending substantially perpendicular to the major surface of said light guide plate and substantially circular in cross-sectional shape in a plane extending substantially parallel to the major surface of said light guide plate on a surface of said another outgoing light control board facing the major surface of said light guide member, and is disposed on the major surface of said light guide member on the side of said liquid crystal display panel with said other columnar convex portions made adherent to the major surface of said light guide member on the side of said liquid crystal display panel.

9. The liquid crystal display device according to claim 8, wherein said incident light adjustment member and said another outgoing light control board are integrally formed.

10. The liquid crystal display device according to claim 4, further comprising a front face reflecting sheet disposed in an area excluding the area where said point light source is disposed on a surface of said incident light adjustment member where said point light source is disposed.

11. A liquid crystal display device having a liquid crystal display panel and a back light disposed on the back face of said liquid crystal display panel, wherein said back light has a light guide member, an incident light adjustment member disposed in a non-effective area of said back light on a surface of said light guide member on the opposite side of said liquid crystal display panel, and a point light source disposed on said incident light adjustment member;

wherein said incident light adjustment member has a plurality of columnar convex portions at least partly circular in cross-sectional shape in a plane extending substantially perpendicular to a major surface of said light guide plate and substantially circular in cross-sectional shape in a plane extending substantially parallel to the major surface of said light guide plate on a surface of an outgoing light control board facing the major surface of said light guide member, and is disposed on the major surface of said light guide member on the opposite side of said liquid crystal display panel with said columnar convex portions made adherent to the major surface of said light guide member on the opposite side of said liquid crystal display panel; and wherein said columnar convex portions of said outgoing light control board are formed in a matrix shape and formed in an area corresponding to the non-effective area between an effective light emitting area for said liquid crystal display panel and said point light source.

12. The liquid crystal display device according to claim 11, further comprising a rear face reflecting sheet disposed in said non-effective area of said back light on the surface of said light guide member on the side of said liquid crystal display panel.

13. The liquid crystal display device according to claim 12, wherein said light guide member has a translucent member formed on a surface on the side of said liquid crystal display panel, and a reflecting member formed in an area outside an area where said incident light adjustment member is disposed on the surface on the opposite side of said liquid crystal display panel, in which the refractive index of said translucent member is smaller than the refractive index of said light guide member.

14. The liquid crystal display device according to claim 11, further comprising a front face reflecting sheet disposed in an area excluding an area where said point light source is disposed on the surface of said incident light adjustment member where said point light source is disposed.

15. The liquid crystal display device according to claim 11, wherein a polarizing reflecting member is used instead of said translucent member, and a transmission axis of said polarizing reflecting member is provided on a surface of said display panel opposed to said back light, and has the same direction as a transmission axis of a polarizer.

16. The liquid crystal display device according to claim 11, further comprising another outgoing light control board disposed in an area corresponding to the effective light emitting area for said liquid crystal display panel on the major surface of said light guide member on the side of said liquid crystal display panel, wherein said another outgoing light control board has a plurality of other columnar convex portions at least partly circular in cross-sectional shape in a plane extending substantially perpendicular to the major surface of said light guide plate and substantially circular in cross-sectional shape in a plane extending substantially parallel to the major surface of said light guide plate on a surface of said another outgoing light control board facing the major surface of said light guide member, and is disposed on the major surface of said light guide member on the side of said liquid crystal display panel with said other columnar convex portions made adherent to the major surface of said light guide member on the side of said liquid crystal display panel.

17. The liquid crystal display device according to claim 16, wherein said incident light adjustment member and said another outgoing light control board are integrally formed.

* * * * *